United States Patent [19]

Abe

[11] Patent Number: 5,107,891

[45] Date of Patent: Apr. 28, 1992

[54] SAFETY DEVICE FOR GAS WELDING

[75] Inventor: Masayuki Abe, Tokyo, Japan

[73] Assignee: Sanki Kogyo Yugen Kaisha, Japan

[21] Appl. No.: 577,909

[22] Filed: Sep. 5, 1990

[30] Foreign Application Priority Data

Sep. 5, 1989 [JP] Japan .............. 1-103539[U]

[51] Int. Cl.⁵ .............................................. F16K 37/00
[52] U.S. Cl. ...................................... 137/557; 137/556; 137/456; 137/614.17
[58] Field of Search ........... 137/556, 557, 559, 614.17, 137/456, 553, 550

[56] References Cited

U.S. PATENT DOCUMENTS

| | | | |
|---|---|---|---|
| 2,638,582 | 5/1953 | Urso et al. | 137/553 |
| 2,676,611 | 4/1954 | Page | 137/456 |
| 3,799,195 | 3/1974 | Hermans | 137/553 |
| 4,660,600 | 4/1987 | Bergeron | 137/557 |
| 4,774,983 | 10/1988 | Abe | 137/614.17 |

FOREIGN PATENT DOCUMENTS

| | | | |
|---|---|---|---|
| 0006475 | 1/1984 | Japan | 137/553 |
| 63-59041 | 2/1985 | Japan . | |

Primary Examiner—A. Michael Chambers
Attorney, Agent, or Firm—Bruce L. Adams; Van C. Wilks

[57] ABSTRACT

A safety device for gas welding has a cylindrical main body having a flow path for an inflammable gas. A cylindrical cover is mounted on the outer periphery of the main body in such a manner that it can reciprocate on the outer periphery. The main body is provided with a normal-flow indicating mark and a counter-flow indicating mark which are positioned in space-apart relation on the outer periphery of the main body. One of the counter-flow and normal-flow indicating marks is exposed and the remaining one is covered alternately, depending on whether the flow condition is counter-flow or normal-flow.

13 Claims, 2 Drawing Sheets

SAFETY DEVICE FOR GAS WELDING

BACKGROUND OF THE INVENTION

The present invention relates to safety devices for welding and more particularly to a safety device for gas welding.

There are known safety devices installed on the side of such an inflammable gas as acetylene gas for use in welding. When oxygen gas or a mixture of oxygen gas and acetylene gas flows backward to the acetylene gas side, whether the gas is in the burning state or not, the known practice is to warn the operator of the counter-flow by means of a counter-flow indicating mark while blocking the counter-flow of the gas.

Although the counter-flow itself can be made known by means of the counter-flow indicating mark in such a safety device for gas welding, there still exists much inconvenience in that the normal-flow condition is left unknown.

SUMMARY OF THE INVENTION

An object of the present invention is to provide a safety device for gas welding which is capable of indicating not only the occurrence of a counter-flow by means of a counter-flow indicating mark but also a normal-flow condition by means of a normal-flow indicating mark to ensure welding work safety.

In order to accomplish the foregoing object, the safety device for gas welding according to the present invention comprises a cylindrical main body having a flow path for an inflammable gas. Check valve means is provided in the main body. A cylindrical cover is mounted on the outer periphery of the main body in such a manner that it can reciprocate thereon. A counter-flow mark and a normal-flow mark are positioned a predetermined space apart, wherein the counter-flow mark is covered with the cylindrical cover and the normal-flow mark is exposed in the normal-flow condition. During a counter-flow condition, the cylindrical cover is moved so that the normal flow mark is covered and the counter-flow mark is exposed thus indicating the counter-flow condition.

BRIEF DESCRIPTION OF THE DRAWINGS

The invention will now be described in detail with reference to the accompanying drawings, in which.

DESCRIPTION OF THE PREFERRED EMBODIMENT

Figure 1:
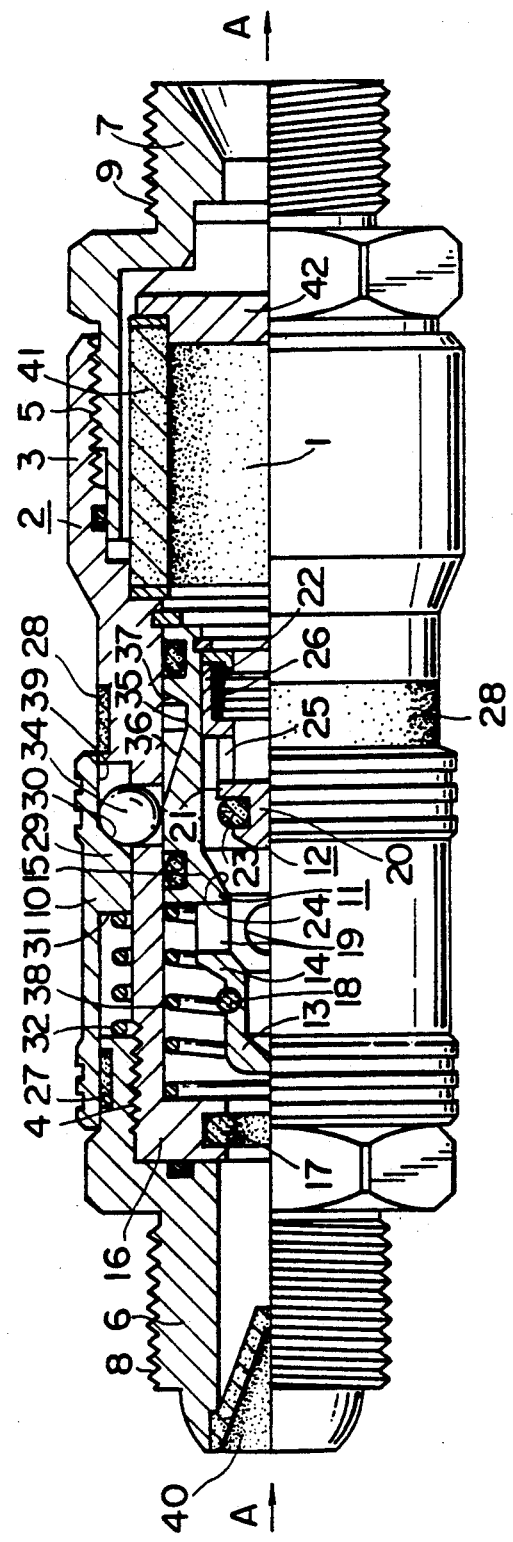
FIG. 1 is a sectional view of a safety device for gas welding under the normal-flow condition of inflammable gas according to the present invention.

A safety device for gas welding according to the present invention comprises a cylindrical main body 2 having a flow path 1 for an inflammable gas, a check valve means provided in the main body 2, and a cylindrical cover 10 mounted on the outer periphery of the main body in such a manner that it can reciprocate thereon. The main body 2 is provided with a normal-flow indicating mark 28 and a counter-flow indicating mark 27 which are positioned a predetermined space apart on its outer periphery and perceivable by the welder. The normal-flow indicating mark 28 is used for indicating the normal-flow of the inflammable gas, whereas the counter-flow indicating mark 27 is used for indicating the outbreak of the counter-flow. The cover 10 is so positioned as to cover the counter-flow indicating mark 27 and to expose the normal-flow indicating mark 28 under the normal-flow condition. Upon the outbreak of the counter-flow, the cover 10 is so positioned as to cover the normal-flow indicating mark 28 and to expose the counter-flow indicating mark 27 with respect to the operation of the check valve means.

The main body 2 comprises a central cylindrical body portion 3 and connecting portions 6, 7 connected to the respective ends of the body portion 3 with screws 4, 5. The connecting portion 6 is coupled to a pipe (not shown) or the like on the inflammable gas supply side with an external thread 8 on its outer periphery. The connecting portion 7 is coupled to a pipe (not shown) or the like on the welding tool side with an external thread 9 on its outer periphery. The inflammable gas is caused to flow into the device from the connecting portion 6 under the normal-flow condition and to flow out of the connecting portion 7.

The cover 10 is mounted on the body portion 3 and capable of not only rotating but also linearly reciprocating with respect to the body portion, part of the cover is also mounted on the outer periphery of the connecting portion 6.

The check valve means for preventing the counter-flow of the gas is incorporated in the flow path of the body portion 3 and comprises a movable valve seat and a check valve body 12.

The movable check valve seat 11 is composed of a reduced small diameter cylindrical portion 13, a reduced middle diameter cylindrical portion 14 and an enlarged diameter cylindrical portion 15. The reduced small diameter cylindrical portion 13 is directed to the gas supply side. The reduced small diameter cylindrical portion 13 is airtightly inserted into a rubber O-ring 17 on the inner peripheral face of an inner flange 16 of the body portion 3 to block the counter-flow when it occurs. Moreover, the reduced small diameter cylindrical portion 13 is provided with a rubber O-ring 18 on its outer periphery and the O-ring 18 also airtightly contacts with the side of the inner flange 16 to block the counter-flow when it occurs. The leading end of the reduced small diameter cylindrical portion 13 is closed and, on receiving counter-flow pressure, the closed end quickly causes the valve seat 11 to move in the counter-flow direction (opposite to what is indicated by an arrow A). The reduced middle diameter cylindrical portion 14 has a plurality of equally spaced vent holes 19 and the gas is supplied from the supply side via the vent holes 19 to the tool side (in the direction of the arrow A). The enlarged diameter cylindrical portion 15 incorporates the check valve body 12 in its inner peripheral face and the counter-flow is blocked mainly by this check valve body.

The check valve body 12 is also composed of a reduced small diameter cylindrical portion 20, a reduced middle diameter cylindrical portion 21 and an enlarged diameter cylindrical portion 22. The reduced small diameter cylindrical portion 20 can be inserted into the reduced middle diameter cylindrical portion 14 of the valve seat 11 and fitted with a rubber O-ring 23 on its outer periphery. This O-ring 23 airtightly contacts with a shoulder portion 24 of the enlarged diameter cylindrical portion 15 of the valve seat to block the counter-flow. The leading end of the reduced small diameter cylindrical portion 20 is closed and, on receiving the counter-flow pressure, the closed end quickly causes the check valve body 12 to move in the counter-flow direction (opposite to what is indicated by the arrow A). The reduced middle diameter cylindrical portion 21 has a plurality of equally spaced vent holes 25 and the gas is supplied from the supply side via the vent holes 25 to the tool side (in the direction of the arrow A). The enlarged diameter cylindrical portion 22 slides on the inner peripheral face of the enlarged diameter cylindrical portion 15 of the valve seat. A compression coil spring 26 is provided within the inner side of the enlarged diameter cylindrical portion 22 to shut the check valve body 12 even though the counter-flow pressure is low.

The counter-flow indicating mark 27 may be displayed as a red color mark provided on the outer periphery of the connecting portion 6, whereas the normal-flow indicating mark 28 may be displayed as a blue color mark provided in the body portion 3. These marks 27, 28 are in such a relation that, when one of them is covered by the cylindrical cover 10, the other is exposed.

The cover 10 has an annular risen portion 29 on its inner periphery between the ends. One-side shoulder portion 29, 30 of the risen portion is inclined, whereas the other-side shoulder portion 31 thereof is perpendicular. A compression coil spring 32 is provided between the other-side shoulder portion 31 and the connecting portion 6 and the spring 32 applies force to the cover 10 in the normal-flow direction (in the direction of the arrow A).

The body portion 3 has a plurality of equally spaced ball retaining holes 33, in each of which a ball 34 is inserted.

The valve seat 11 has an annular groove 35 in its outer periphery and one-side face 37 of the groove is steeply inclined, whereas the other-side face 36 is gently inclined. The valve seat is also biased by a compression coil spring 38 in the normal-flow direction (in the direction of the arrow A) at all times.

FIG. 1 shows a state in which the gas is flowing in the normal direction (in the direction of the arrow A) within the safety device. The cover 10 is moved in the counter-flow direction (opposite to what is shown by the arrow A) against the force of the spring 32, whereas the valve seat 11 is moved by the spring 38 in the normal-flow direction (in the direction of the arrow A). The ball 34 is forced outside on the outer periphery of the valve seat 11 and part of the ball contacts with an inner peripheral face 39 of the cover 10, thus preventing itself from springing out. The ball 34 also contacts the inclined portion 30 of the risen portion 29, thus confining the cover 10 to the position where it has been moved in the counter-flow direction (opposite to what is shown by the arrow A) against the force of the spring 32. The valve seat 11 and check valve body 12 are so positioned as to open the flow path. In this state, the cover 10 covers the counter-flow indicating mark 27 and simultaneously exposes the normal-flow indicating mark 28. The normal-flow condition is thus indicated.

When the counter-flow occurs in the direction opposite to what is shown by the arrow A, the check valve body 12 is moved in the direction opposite to what is shown by the arrow A because of the counter-flow pressure and the O-ring 23 is airtightly pressed against the shoulder portion 24 of the valve seat 11 to block the counter-flow. Moreover, the check valve body 12 causes the valve seat 11 to move in the same direction against the force of the spring 38. The reduced small diameter cylindrical portion 13 of the valve seat 11 is then airtightly inserted into the O-ring 17 on the body portion side 3 and the O-ring 18 of the valve seat 11 is also airtightly pressed against the flange 16 of the body portion 3, so that the counter-flow which may cause leakage from the check valve body 12 is blocked. When the annular groove 35 reaches the position of the balls 34 as the valve seat 11 moves, the balls 34 become movable into the groove 35. While the cover 10 is moved by the spring 32 in the direction of the arrow A, the cover 10 forces part of each ball 34 into the groove 35 by means of the inclined portion 30 of its annular risen portion 29 and retains the balls at that position by means of the inner peripheral face of the risen portion 29. The valve seat 11 is confined to the closed position of the flow path in this manner. The cover 10 thus moved exposes the counter-flow indicating mark 27 and covers the normal-flow indicating mark 28 to indicate the outbreak of the counter-flow (FIG. 2).

Figure 2:
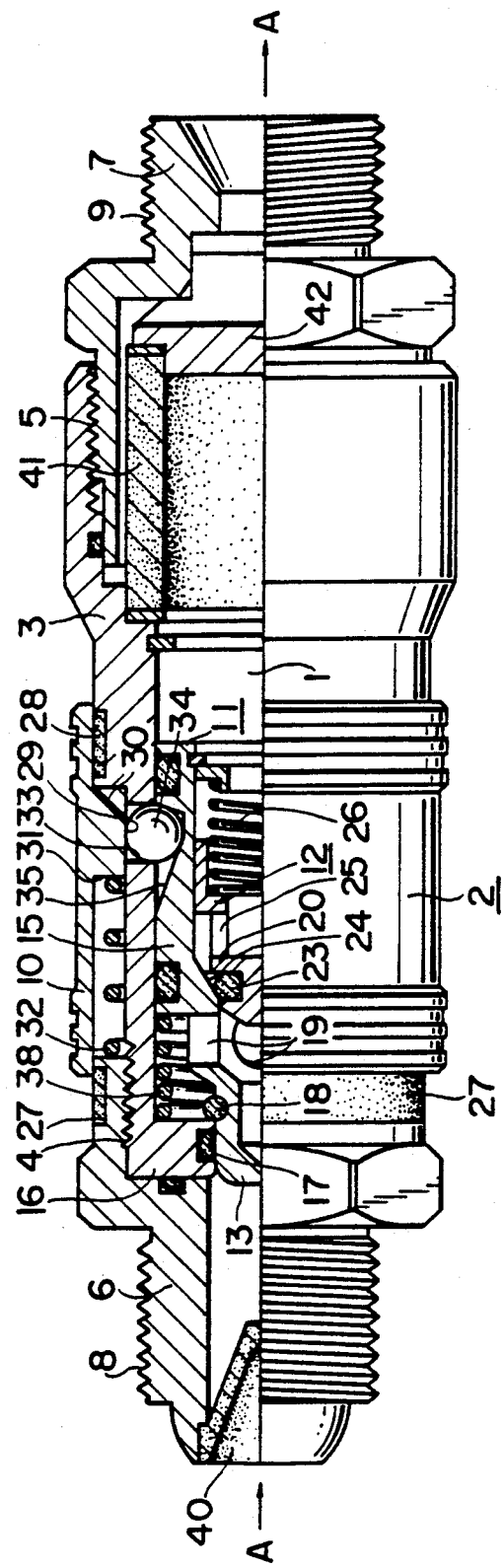
FIG. 2 is a sectional view of the safety device for gas welding under the counter-flow condition of inflammable gas according to the present invention.

When the gas is caused to flow in the normal-flow direction, the cover 10 is manually moved in the direction opposite to what is shown by the arrow A from the state shown in FIG. 2 up to what is shown in FIG. 1. The balls 34 in the groove 35 are released from confinement and the valve seat 11 is moved by the spring 38 in the direction in which it opens the flow path (in the direction of the arrow A). The balls 34 then confine the cover 10 to the condition shown in FIG. 1 and the cover 10 covers the counter-flow indicating mark 27 and exposes the normal-flow indicating mark 28 again.

A filter 40 for removing dust is provided in the connecting portion 6 and a filter 41 made of sintered metal for checking the passage of back-fire is provided in the connecting portion 7 by means of a bearing 42. The normal-flow and the counter-flow of the gas are guided by the bearing 42 so as to pass through the filter 41.

As set forth above, the welder can be informed of the normal-flow or counter-flow of an inflammable gas with a single glance at the normal-flow indicating mark 28 or counter-flow indicating mark 27. Safety in welding work is thus improved.

What is claimed is:

1. A safety device for gas welding, comprising: a cylindrical main body having a flow path for an inflammable gas, a normal-flow indicating mark disposed thereon and a counter-flow indicating mark disposed thereon; a cylindrical cover slidably mounted on the outer periphery of the cylindrical main body and effective to cover either one of the normal-flow indicating mark and the counter-flow indicating mark while leaving the other one of the normal-flow indicating mark and the counter-flow indicating mark exposed; and check valve means operative during a normal flow condition to maintain the cylindrical cover at a position effective to expose the normal-flow indicating mark and cover the counter-flow indicating mark, the check valve means being operative during a counter flow condition to release the cylindrical cover and allow the cylindrical cover to be moved to a position where the normal-flow indicating mark is covered and the counter-flow indicating mark is exposed.

2. A safety device for gas welding according to claim 1; wherein the check valve means comprises a movable valve seat which reciprocates along the flow path and a check valve body engagable with the movable valve seat so as to block the counter-flow during the counter-flow condition, wherein said movable valve seat is biased by first spring means in a direction of the check valve body and urged by the check valve body during the counter-flow condition in a direction against the force of the first spring means; and wherein the cover is moved to a position where it covers the normal-flow indicating mark and exposes the counter-flow indicating mark when the movable valve seat is urged by the check valve body during the counter-flow condition.

3. A safety device for gas welding according to claim 2; further comprising second spring means for biasing said cover in the direction of exposing said counter-flow indicating mark and covering said normal-flow indicating mark; means for confining said cover to the position of exposing said normal-flow indicating mark against the force of said second spring means; and means for releasing the confinement of said cover in accordance with counter-flow pressure.

4. A safety device for gas welding according to claim 3; wherein said means for confining said cover to the position exposing said normal-flow indicating mark and covering said counter-flow indicating mark comprises an engaging portion provided on the inner peripheral face of said cover and balls retained in respective ball retaining holes, said balls engaging with said engaging portion so as to confine said cover to the position exposing said normal-flow indicating mark and covering said counter-flow indicating mark against the force of spring means, wherein the engagement of said engaging portion with said balls is maintained by the outer periphery of said movable valve seat in contact with said balls; wherein said means for releasing the confinement of said cover upon the outbreak of the counter-flow is provided with an annular groove for receiving said balls, said groove being formed in the outer periphery of said movable valve seat so as to allow the release of said balls from said engaging portion; and wherein said groove automatically takes a release position in conformity with that of said balls as said movable valve seat moves because of the counter-flow pressure, whereby said cover is moved to the position exposing said counter-flow indicating mark and covering said normal-flow indicating mark.

5. A safety device for gas welding according to claim 4; wherein said check valve body includes a packing made of elastic material such as rubber provided on the outer periphery of said check valve body so as to block the counter-flow by airtightly contacting with a valve seat portion of said movable valve seat, and wherein said check valve body and said movable valve seat are provided with respective vent holes for the normal-flow of the gas.

6. A safety device for gas welding according to claim 5; wherein the airtight contact between the valve seat portion of said main body and the packing provided on said movable valve seat is utilized for blocking the counter-flow flowing beyond said check valve means.

7. A safety device for gas welding according to claim 1; wherein the cylindrical main body is equipped with a first filter for preventing back-fire from flowing toward a gas supply side and a second filter for preventing dust from flowing toward working tools.

8. A safety device for gas welding according to claim 1; wherein one end of the cylindrical main body is connected to a gas supply side, whereas the other end thereof is connected to a welding tool side.

9. A safety device for gas welding according to claim 1; wherein said normal-flow indicating mark is provided in an annular form on the outer periphery of said main body and displayed in a first color, whereas said counter-flow indicating mark is provided also in an annular form on the outer periphery thereof and displayed in a second color different from the first color.

10. A safety device for gas welding, comprising: a cylindrical main body having a flow path for an inflammable gas, a normal-flow indicating mark disposed thereon and a counter-flow indicating mark disposed thereon; a cylindrical cover slidably mounted on the outer periphery of the cylindrical main body and slidable to cover either one of the normal-flow indicating mark and the counter-flow indicating mark while leaving the other one of the normal-flow indicating mark and the counter-flow indicating mark exposed; biasing means including a spring for biasing the cylindrical cover in a direction effective to cover the normal-flow indicating mark and expose the counter-flow indicating mark; confining means for confining the cylindrical cover against the force of the spring at a position effective to expose the normal-flow indicating mark and cover the counter-flow indicating mark; and check valve means operative during a normal flow condition to maintain the confining means as confining the cylindrical cover at a position effective to expose the normal-flow indicating mark and cover the counter-flow indicating mark, the check valve means being operative during a counter flow condition to release the confinement of the cylindrical cover by the confining means and allow the cylindrical cover to be moved by the biasing means to a position where the normal-flow indicating mark is covered and the counter-flow indicating mark is exposed.

11. A safety device for gas welding according to claim 10; wherein the normal-flow indicating mark comprises an annular colored mark formed on the outer periphery of the cylindrical main body, and the counter-flow indicating mark comprises an annular differently colored mark formed on the outer periphery of the cylindrical main body.

12. A safety device for gas welding, comprising; a cylindrical main body having a flow path for an inflammable gas, a normal-flow indicating mark and a counter-flow indicating mark disposed thereon, and having a plurality of annularly spaced ball-retaining holes; a cylindrical cover slidably mounted on the outer periphery of the cylindrical main body and slidable to cover either one of the normal-flow indicating mark and the counter-flow indicating mark while leaving the other one of the normal-flow indicating mark and the counter-flow indicating mark exposed, the cylindrical cover having an inner periphery surface defining an inclined shoulder portion; biasing means including a spring for biasing the cylindrical cover in a direction effective to cover the normal-flow indicating mark and expose the counter-flow indicating mark; a plurality of balls retained in the respective ball-retaining holes and retained by the inner periphery surface of the cylindrical cover, the plurality of balls being engagable with the shoulder portion to confine the cylindrical cover against the force of the spring at a position effective to expose the normal-flow indicating mark and cover the counter-flow indicating mark; a movable valve seat having an outer peripheral surface effective to retain the plurality of balls in the engaged position with the shoulder portion during a normal flow condition and having an annular groove, the valve seat being movable in response to a counter flow condition to a position which allows each of the plurality of balls to shift into the annular groove and disengage from the shoulder portion thereby releasing the confinement of the cylindrical cover and allow the cylindrical cover to be moved by the biasing means to a position where the normal-flow indicating mark is covered the counter-flow indicating mark is exposed; and a check valve body operative during a counter flow condition in conjunction with the movable valve seat to seal off the flow path, and operative to move the movable valve seat during a counter flow condition to the position which allows each of the plurality of balls to shift into the annular groove.

13. A safety device for gas welding according to claim 12; wherein the normal-flow indicating mark comprises an annular colored mark formed on the outer periphery of the cylindrical main body, and the counter-flow indicating mark comprises an annular differently colored mark formed on the outer periphery of the cylindrical main body.

* * * * *